J. FLETCHER.
ADJUSTABLE BENCH DOG.
APPLICATION FILED DEC. 31, 1909.
972,610.
Patented Oct. 11, 1910.
2 SHEETS—SHEET 1.
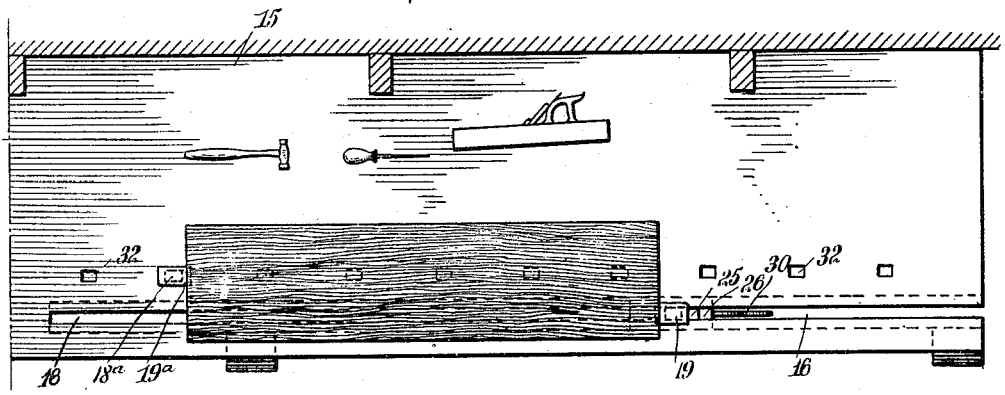
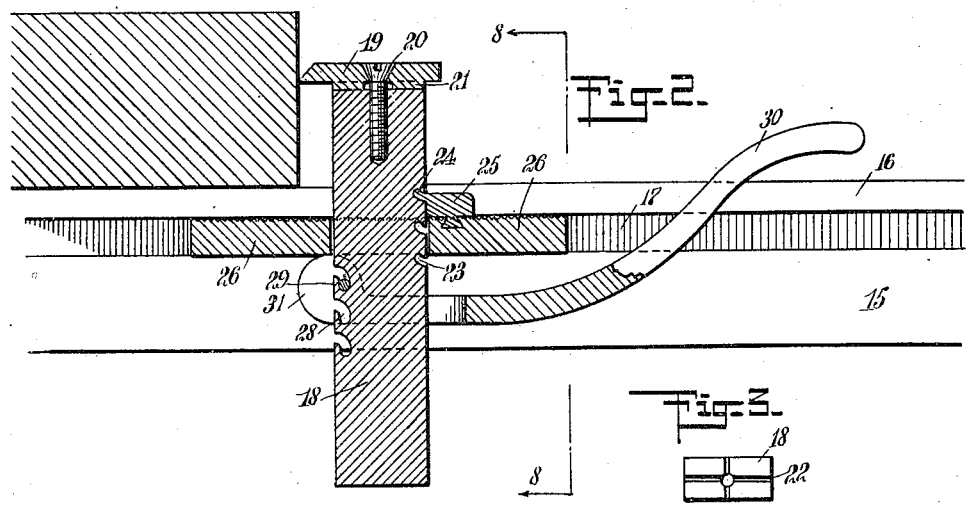
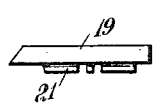
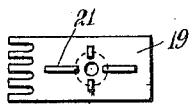
WITNESSES:
INVENTOR
Joseph Fletcher
BY
ATTORNEYS J. FLETCHER.
ADJUSTABLE BENCH DOG.
APPLICATION FILED DEC. 31, 1909.
972,610.
Patented Oct. 11, 1910.
2 SHEETS—SHEET 2.
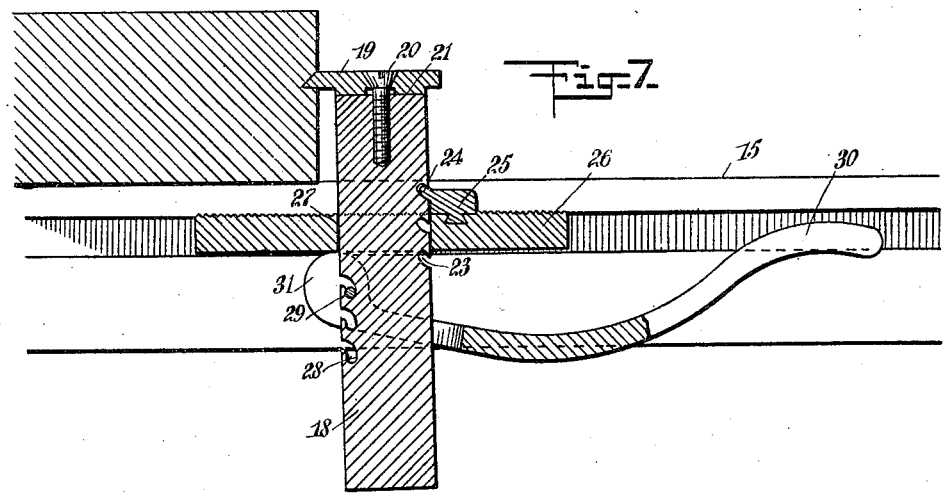
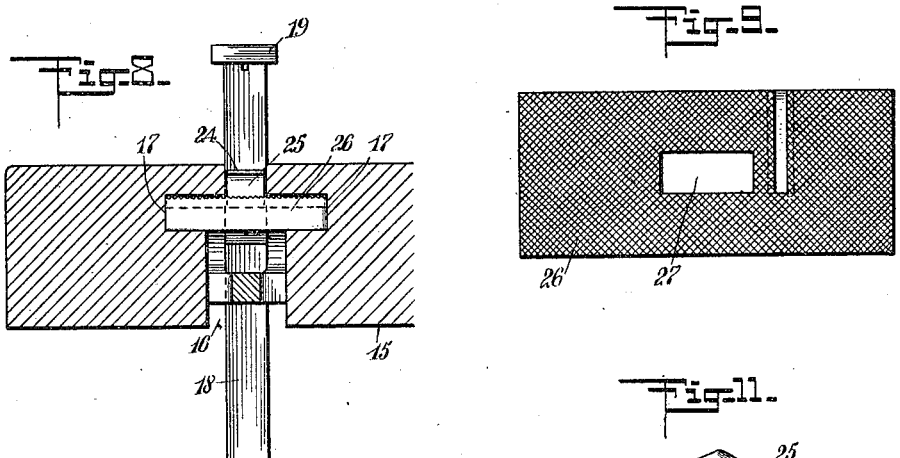
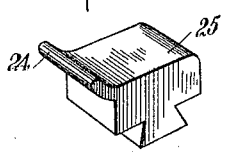
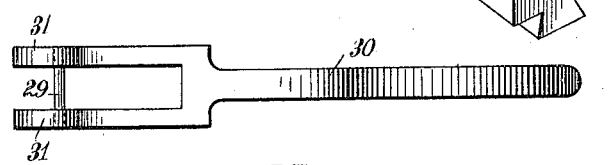
WITNESSES:
INVENTOR
Joseph Fletcher
BY
ATTORNEYS

UNITED STATES PATENT OFFICE.

JOSEPH FLETCHER, OF BRICK SCHOOL, NORTH CAROLINA.

ADJUSTABLE BENCH-DOG.

972,610.  Specification of Letters Patent.  Patented Oct. 11, 1910.

Application filed December 31, 1909. Serial No. 535,752.

*To all whom it may concern:*

Be it known that I, JOSEPH FLETCHER, a citizen of the United States, and a resident of Brick School, in the county of Edgecombe and State of North Carolina, have invented a new and Improved Adjustable Bench-Dog, of which the following is a full, clear, and exact description.

The invention is an improvement in bench dogs such as are used in connection with carpenters' work benches for holding down one end of a board, and has for its purpose to provide a dog adjustable along the length of the bench and at different elevations, having an actuating member such as a lever, connected thereto in a manner to force the bit of the dog forwardly and draw it downwardly and clamp the dog in place by simply moving the lever in one direction, the dog being carried by a clamping-block which is adjustable in an undercut slot passing through the bench, which slot allows the shavings and small chips to drop through and not interfere with the adjustment of the dog.

Reference is to be had to the accompanying drawings forming a part of this specification, in which similar characters of reference indicate corresponding parts in all the views.

Figure 1 is a plan of a work bench having my improved dog applied thereto; Fig. 2 is a fragmentary vertical section through the bench and dog; Fig. 3 is a plan of the dog post; Fig. 4 is a vertical section through the upper portion of the post, with the bit removed; Fig. 5 is an edge view of the bit; Fig. 6 is an inverted plan of the bit; Fig. 7 is a sectional view similar to Fig. 2, with the operating lever depressed to engage the bit with the board on the bench; Fig. 8 is a section on the line 8—8 of Fig. 2; Fig. 9 is a plan of the clamping-block; Fig. 10 is a plan of the operating lever; and Fig. 11 is a perspective view of the pivot-block.

In carrying out my invention, I provide a work bench 15, with a vertical slot 16, ordinarily extending longitudinally of the bench adjacent to the front edge, the slot passing through one end of the bench and extending a distance according to the range of adjustment which it is desired that the dog have. The slot, as best shown in Fig. 8, has oppositely-arranged grooves 17, in the side walls intermediate the thickness of the bench top, with the portion of the slot above the grooves relatively narrower than the portion below. The dog as constructed in accordance with my invention, is designed to be slidably received in the slot and grooves and comprises a post 18, of a width to fit the narrower upper portion of the slot, and is capped by a bit or spur 19, the bit being preferably detachably connected to the post by a screw 20, and having cross-ribs 21 on its under side, arranged to engage corresponding grooves 22, in the top of the post, this manner of forming the connection between the bit and post obviously preventing the bit from turning when the screw is tightened, and permitting of the bit being reversed and interchanged with bits likewise constructed on the under side. The outer edge of the post is provided with a number of pivot notches 23, arranged one above the other and preferably inclining upwardly and inwardly. In any one of these notches is adapted to engage a pivot 24, carried by a pivot-block or support 25, the latter being in turn carried on a clamping-block 26, and, as shown, seats on the upper face thereof and has a dovetailed connection therewith to permit of the block being readily detached. The post 18 passes through an opening 27, formed substantially centrally of the clamping-block 26, and at its inner edge is provided with a number of pivot notches 28, in any one of which is adapted to engage a pivot-pin 29, of a cam-operating lever 30, the notches being downwardly directed a slight distance to prevent the accidental disengagement of the pivot-pin. The pivot-pin 29 extends between cams 31 of the cam-lever, the cams being formed at the end of the fork in the lever which receives the post 18. The notches 23 and 28 are spaced equal distances apart and obviously permit of the bit being adjusted to different elevations above the bench. When the pivot-pin 29 of the cam-lever is engaged in the notch immediately below the clamping-block, the cams rest on the under side of the latter at the opposite sides of the post, the clamping-block preferably having a serrated upper face so that when it is pressed upwardly it will firmly engage the upper walls of the grooves 17. The handle of the lever is curved upwardly to pass through the slot 16 at the rear of the clamping-block and stand above the bench when the lever is applied. When the lever is depressed, the cams force the clamping-block upwardly and secure the block against movement, at the same time the post is drawn downwardly under the action of the pivot-pin 29, causing the bit to swing forwardly and downwardly into engagement with the board which is to be clamped to the top of the table, the swinging movement of the bit taking place with the pivot 24 as its fulcrum. It is thus seen that by a single movement of the lever, the dog is locked in adjusted position and the bit given both a downward and a forward movement.

Any suitable means may be provided in connection with the bench for engaging the opposite end of the board. I, however, preferably employ for this purpose a post 18<sup>a</sup> and a bit 19<sup>a</sup>, similar to the post 18 and bit 19, the post being adapted to be passed into any one of a number of openings 32 formed in the table at one side of the slot 16.

Having thus described my invention, I claim as new and desire to secure by Letters Patent:

1. An adjustable bench dog comprising a clamping-block, a post having a bit, a pivot-block carried by the clamping-block and having a pivot supporting the post adjacent to one edge thereof, and an operating lever fulcrumed on the post adjacent to the opposite edge thereof and having a cam arranged to engage the under side of the clamping-block.

2. A bench dog comprising a clamping-block, a post supported on the clamping-block and extending therethrough and having a bit secured to its upper end, and an operating-lever fulcrumed on the post and having a cam bearing on the under side of the clamping-block.

3. A bench dog comprising a clamping-block, a post arranged at approximately right-angles to the clamping block and having a bit secured to its upper end, a pivot for the post adjacent to one edge thereof, supported on and above the clamping-block, an operating lever having a pivot arranged below the clamping-block and carried by the post adjacent to its opposite edge, and a cam in connection with the operating lever, arranged to bear on the under side of the clamping-block.

4. A bench dog comprising a clamping-block, a post extending through the clamping-block, having a bit secured to the upper portion thereof and provided with pivot notches in its opposite edges, a support carried by the clamping-block, having a pivot arranged thereabove adapted to engage in any one of the notches at one edge of the post, a clamping lever having a fork to receive the post, cams carried by the fork, and a pivot-pin extending between the cams and adapted to be engaged in any one of the notches at the opposite edge of the post and bring the cams to bear against the under side of the clamping-block.

5. The combination of a work bench having a slot extending therethrough, a clamping-block slidably supported in the slot, a post in connection with the clamping-block and extending through the slot, having a bit at the upper end thereof, and an operating lever fulcrumed to the post and having a cam arranged to engage the under side of the clamping-block, with the handle of the lever extending through the slot above the top of the bench.

6. The combination of a work bench having a slot extending therethrough and provided with opposed grooves at the opposite sides of the slot, a clamping-block slidable in the grooves, a post extending through the slot and clamping-block, having a bit secured to the upper portion thereof, and an operating lever having a cam arranged to bind the block in the grooves, and fulcrumed at a point on the post to force the bit downwardly and forwardly when the lever is moved to clamping position.

7. The combination of a work bench having an undercut slot, a clamping-block adjustable in the slot, a dog to clamp a board to the top of the bench having a post supported on the block to have a limited tilting movement, and an operating lever arranged when moved in one direction to force the block upwardly into clamping engagement with the bench and force the dog downwardly and forwardly.

8. The combination of a work bench having an undercut slot, a clamping block slidable in the slot, a post passing through and fulcrumed on the block to have a slight tilting movement, a dog to clamp a board to the top of the bench, carried by and movable with the post, and an operating lever having a cam arranged to bear against the under side of the clamping block and fulcrumed to the post at a point to swing the post with the dog downwardly and forwardly when the cam forces the block upwardly into clamping engagement with the bench.

9. The combination of a work bench having an undercut slot, a clamping-block slidable in the slot, a dog supported on the clamping block to have a slight tilting movement, and an operating lever arranged when moved in one direction to force the dog downwardly and forwardly and force the clamping-block upwardly into clamping engagement with the bench.

In testimony whereof I have signed my name to this specification in the presence of two subscribing witnesses.

JOSEPH FLETCHER.

Witnesses:
 THOMAS S. INBORDEN,
 ISADORE MARTIN.